United States Patent
Leong et al.

(10) Patent No.: US 11,675,607 B2
(45) Date of Patent: *Jun. 13, 2023

(54) DATA TRANSFERS FROM MEMORY TO MANAGE GRAPHICAL OUTPUT LATENCY

(71) Applicant: Google LLC, Mountain View, CA (US)

(72) Inventors: Jian Wei Leong, San Francisco, CA (US); Leo Baghdassarian, Mountain View, CA (US); Lucas Hiroshi De Carvalho Hirata, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/589,363

(22) Filed: Jan. 31, 2022

(65) Prior Publication Data

US 2022/0179666 A1    Jun. 9, 2022

Related U.S. Application Data

(63) Continuation of application No. 16/463,753, filed as application No. PCT/US2017/054914 on Oct. 3, 2017, now Pat. No. 11,237,849.

(51) Int. Cl.
    *G06F 9/451*    (2018.01)
    *G06F 3/0346*   (2013.01)
    (Continued)

(52) U.S. Cl.
    CPC ............. *G06F 9/451* (2018.02); *G06F 3/038* (2013.01); *G06F 3/0346* (2013.01);
    (Continued)

(58) Field of Classification Search
    None
    See application file for complete search history.

(56) References Cited

U.S. PATENT DOCUMENTS

| 6,675,300 B1 | 1/2004 | Jung et al. |
| 11,237,700 B2 | 2/2022 | Somaiya et al. |

(Continued)

FOREIGN PATENT DOCUMENTS

| EP | 2555537 | 6/2013 |
| JP | H04223650 | 8/1992 |

OTHER PUBLICATIONS

European Patent Office; Communication pursuant to Article 94(3) EPC issued in Application No. 17787294.2; 6 pages; dated Sep. 8, 2021.

(Continued)

*Primary Examiner* — Christopher J Fibbi
(74) *Attorney, Agent, or Firm* — Gray Ice Higdon

(57) ABSTRACT

Systems and methods of transferring data from memory to manage graphical output latency are provided. A device having a display receives an acoustic signal that carries a query. The device determines that a wireless controller is in a first state. The device establishes, based on receipt of the acoustic signal and the determination that the wireless controller device is in the first state, a first interaction mode for a graphical user interface rendered by the computing device for display via the display device. The device sets a prefetch parameter to a first value and prefetches the corresponding amount of electronic content items. The device establishes a second interaction mode and overrides the first value of the prefetch parameter to a second value, and prefetches a second amount of electronic content items corresponding to the second value.

19 Claims, 4 Drawing Sheets

(51) Int. Cl.
*G06F 3/0482* (2013.01)
*G06F 3/16* (2006.01)
*G06F 16/63* (2019.01)
*G06F 3/038* (2013.01)
*G06F 3/04817* (2022.01)
*G06F 3/0483* (2013.01)
*G06F 3/0485* (2022.01)

(52) U.S. Cl.
CPC .......... *G06F 3/0482* (2013.01); *G06F 3/0483* (2013.01); *G06F 3/0485* (2013.01); *G06F 3/04817* (2013.01); *G06F 3/167* (2013.01); *G06F 16/63* (2019.01); *G06F 2203/0384* (2013.01)

(56) References Cited

U.S. PATENT DOCUMENTS

| | | | |
|---|---|---|---|
| 11,237,849 | B2 | 2/2022 | Leong et al. |
| 2006/0075429 | A1* | 4/2006 | Istvan .................... H04N 7/163 725/39 |
| 2009/0100373 | A1 | 4/2009 | Pixley et al. |
| 2013/0035942 | A1* | 2/2013 | Kim ........................ G06F 3/167 704/E21.001 |
| 2013/0173655 | A1* | 7/2013 | Hoots III, III ........ G06F 16/957 707/769 |
| 2015/0066907 | A1 | 3/2015 | Somaiya et al. |
| 2015/0262005 | A1* | 9/2015 | Ohmura .................. G06F 3/165 348/77 |
| 2019/0013018 | A1 | 1/2019 | Rekstad |

OTHER PUBLICATIONS

International Search Report and Written Opinion fo PCT Ser. No. PCT/US2017/054914, dated Jun. 20, 2018.
European Patent Office; Intention to Grant issued in Application No. 17787294.2, 53 pages, dated Jun. 10, 2022.
China National Intellectual Property Administration; Notification of First Office Action issued in Application No. 201780092030.1; 17 pages; dated Feb. 28, 2023.

* cited by examiner

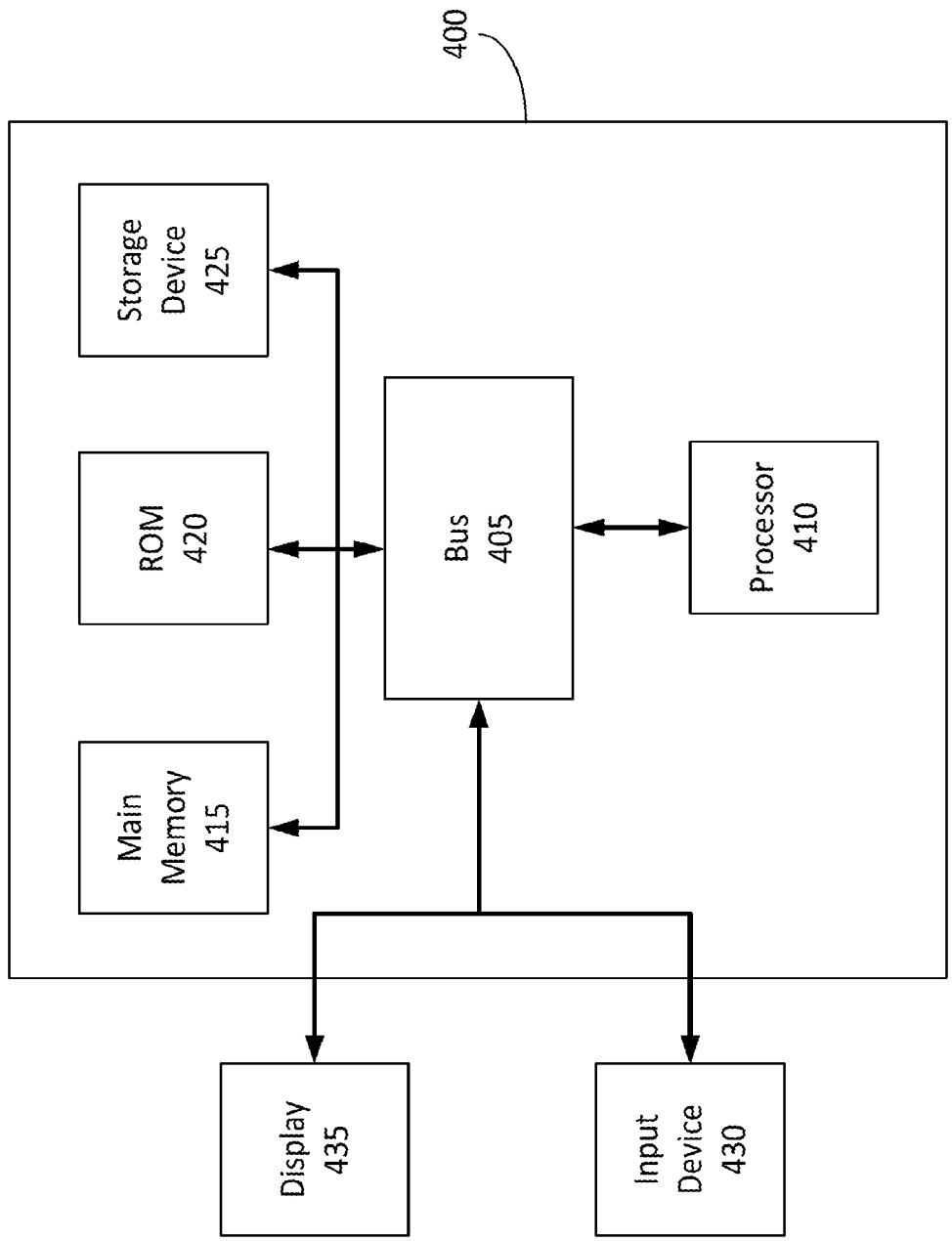

US 11,675,607 B2

DATA TRANSFERS FROM MEMORY TO MANAGE GRAPHICAL OUTPUT LATENCY

BACKGROUND

A computing device with limited interfaces can pose challenges to communicating efficiently in a far-field environment, which can cause delays in rendering a graphical user interface or portions thereof or result in excessive memory usage.

SUMMARY

The present disclosure is generally directed to improving the efficiency and effectiveness of data transfers from memory to manage graphical output latency. Systems and methods of the present disclosure are directed to adjusting a graphical user interface provided by a computing device responsive to the mode of interaction. For example, if the mode of interaction is voice, then the graphical user interface can be established for voice control. If the mode of interaction changes from voice-only to remote control, then the system can detect the change in interaction mode and then dynamically adjust the graphical user interface for the remote control. The computing device can further switch from a scrolling mode (e.g., in the voice interaction mode) to a pagination mode (e.g., in the remote control mode). The computing device can adjust a prefetch amount based on scrolling or pagination in order to reduce latency in rendering the graphical user interface responsive to an instruction.

At least one aspect is directed to a system to transfer data from memory to manage graphical output latency. The system can include a computing device having one or more processors communicatively coupled to a display device and a microphone. The system can include a natural language processing component executed by the computing device. The computing device can receive an acoustic signal that carries a query. The acoustic signal can be detected by the microphone. The computing device can determine that a wireless controller device operational to control the computing device is in a first state. The computing device can establish, based on receipt of the acoustic signal and the determination that the wireless controller device is in the first state, a first interaction mode for a graphical user interface rendered by the computing device for display via the display device. The computing device can set, based on the graphical user interface in the first interaction mode, a prefetch parameter to a first value. The computing device can prefetch, responsive to the query and the prefetch parameter, a first amount of electronic content items corresponding to the first value. The computing device can establish, based on detection of the wireless controller device in a second state different than the first state, a second interaction mode for the graphical user interface. The computing device can override, responsive to establishment of the second interaction mode for the graphical user interface, the first value of the prefetch parameter with a second value different than the first value. The computing device can prefetch, responsive to the prefetch parameter overridden to the second value, a second amount of electronic content items corresponding to the second value.

At least one aspect is directed to a method of transferring data from memory to manage graphical output latency. The method can be performed by a computing device comprising one or more processors communicatively coupled to a display device and a microphone. The method can include the computing device receiving an acoustic signal carrying a query. The acoustic signal can be detected by the microphone. The method can include the computing device determining that a wireless controller device operational to control the computing device is in a first state. The method can include the computing device establishing, based on receiving the acoustic signal and determining the wireless controller device is in the first state, a first interaction mode for a graphical user interface rendered by the computing device for display via the display device. The method can include the computing device setting, based on the graphical user interface being in the first interaction mode, a prefetch parameter to a first value. The method can include the computing device providing the graphical user interface configured with the first interaction mode for display via the display device. The method can include the computing device prefetching, responsive to the query and the prefetch parameter, a first amount of electronic content items corresponding to the first value. The method can include the computing device establishing, responsive to detecting that the wireless controller device entered a second state different than the first state, a second interaction mode for the graphical user interface. The method can include the computing device overriding, responsive to detecting the wireless controller device entered the second state, the first value of the prefetch parameter with a second value different than the first value. The method can include the computing device prefetching, by responsive to the prefetch parameter overridden to the second value, a second amount of electronic content items corresponding to the second value.

These and other aspects and implementations are discussed in detail below. The foregoing information and the following detailed description include illustrative examples of various aspects and implementations and provide an overview or framework for understanding the nature and character of the claimed aspects and implementations. The drawings provide illustration and a further understanding of the various aspects and implementations and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings:

FIG. 4 is a block diagram illustrating a general architecture of a computer system that can be employed to implement elements of the systems and methods described and illustrated herein.

DETAILED DESCRIPTION

Figure 1:
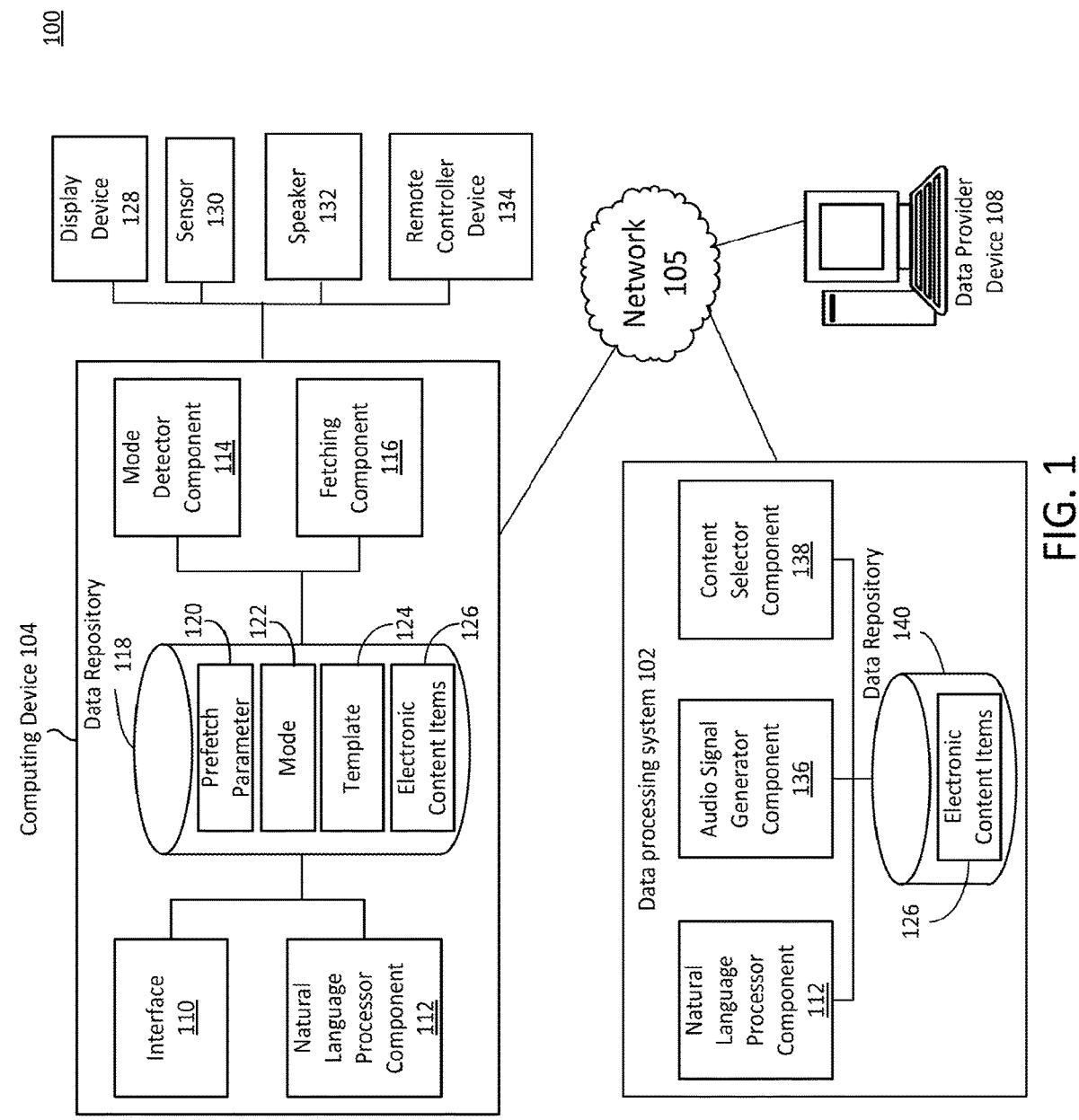
FIG. 1 is an illustration of a system to transfer data from memory to manage graphical output latency.

Following below are more detailed descriptions of various concepts related to, and implementations of, methods, apparatuses, and systems of routing packetized actions via a computer network. The various concepts introduced above and discussed in greater detail below may be implemented in any of numerous ways.

The present disclosure is generally directed to improving the efficiency and effectiveness of data transfer from memory to manage graphical output latency. Systems and methods of the present disclosure are directed to adjusting a graphical user interface provided by a computing device responsive to the mode of interaction. For example, if the mode of interaction is voice, then the graphical user interface can be established for voice control. If the mode of interaction changes from voice-only to remote control, then the system can detect the change in interaction mode and then dynamically adjust the graphical user interface for the remote control. The computing device can further switch from a scrolling mode (e.g., in the voice interaction mode) to a pagination mode (e.g., in the remote control mode). The computing device can adjust a prefetch amount based on scrolling or pagination in order to reduce latency in rendering the graphical user interface responsive to an instruction.

The present solution can reduce resource consumption, processor utilization, battery consumption, bandwidth utilization, size of the data file, or amount of time consumed by a graphics engine by dynamically adjusting the amount of electronic content that is prefetched.

The present solution can facilitate interacting with a computing device having limited interfaces, such a computing device that is out of reach or does not have touch input, where the primary interactions are voice-based or via a remote control. To do so, the present solution can provide new techniques for providing a graphical user interface for display on a display device. For example, the graphical user interface can include a single-row user interface or a one-dimensional user interface. In a one-dimensional user interface, the scrolling interaction can be one-dimensional, thereby reducing the complexity of voice-interactions. For remote control-based interaction, the computing device may provide full screen results with multiple row of results.

Thus, depending on modality, the computing device can provide one or more rows or otherwise adjust parameters associated with the graphical user interface. The graphical user interface can be adjusted responsive to the interaction modality.

For example, the computing device can receive an acoustic signal carrying a query. The acoustic signal can correspond to speech from a user. The query can include "show me action movie." The computing device can identify several action movies and then display, via a graphical user interface, three movies in a one-dimensional row or column. The computing device can scroll through the list responsive to a voice command, such as "next." However, rather than scroll by one icon or one electronic item at a time responsive to a voice command, the computing device can scroll by multiple items. For example, the computing device can scroll by the entire row of icons (e.g., 3, 4, 5, 6, 12 or more) to a next page.

If the computing device detects a remote control is present and active, the computing device can modify the interaction mode of the graphical user interface. The computing device can show a last icon located at the edge of a boundary of the graphical user interface as a partial icon (e.g., show half the icon) to indicate that the remote control can scroll through the list of items. The computing device can further focus on an icon by highlighting the icon to indicate which icon the remote control can select.

When the graphical user interface is pagination mode versus scrolling mode, the computing device can use different prefetch parameters. For example, in pagination mode, the computing device can prefetch a full page's worth of electronic content items, whereas if the computing device is in scrolling mode, the computing device may prefetch one electronic content item. Due to different resource considerations in the different modes, the computing device can adjust the prefetch parameter to reduce latency so the electronic content items can be efficiently rendered if selected.

FIG. 1 illustrates an example system 100 to transfer data from memory to manage graphical output latency. The system 100 can include a data processing system 102. The data processing system 102 can communicate with one or more data provider devices 108, or one or more computing devices 104 via a network 105. The network 105 can include computer networks such as the Internet, local, wide, metro, or other area networks, intranets, satellite networks, and other communication networks such as voice or data mobile telephone networks. The network 105 can be used to access information resources such as electronic content items, media content, web pages, web sites, domain names, or uniform resource locators that can be presented, output, rendered, or displayed on at least one computing device 104, such as a laptop, desktop, tablet, personal digital assistant, smartphone, portable computers, speaker, smart television, set-top box, a digital media player, a microconsole, network appliance, or entertainment device. For example, via the network 105 a user of the computing device 104 can access information or data provided by a data provider 108. The computing device 104 may or may not include a display; for example, the computing device may include limited types of user interfaces, such as a display device 128, sensor 130 (e.g., a microphone), speaker 132, or remote controller device 134. In some cases, the primary user interface of the computing device 104 may be a microphone and speaker 132.

The network 105 can include or constitute a display network, e.g., a subset of information resources available on the internet that are associated with a content placement or search engine results system, or that are eligible to include third-party content items as part of a content item placement campaign. The network 105 can be used by the computing device 104 or data processing system 102 to access information resources such as web pages, web sites, domain names, or uniform resource locators that can be presented, output, rendered, or displayed by the client computing device 104. For example, via the network 105 a user of the client computing device 104 can access information or data provided by the data provider computing device 108.

The network 105 may be any type or form of network and may include any of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. The network 105 may include a wireless link, such as an infrared channel or satellite band. The topology of the network 105 may include a bus, star, or ring network topology. The network may include mobile telephone networks using any protocol or protocols used to communicate among mobile devices, including advanced mobile phone protocol ("AMPS"), time division multiple access ("TDMA"), code-division multiple access ("CDMA"), global system for mobile communication ("GSM"), general packet radio services ("GPRS") or universal mobile telecommunications system ("UMTS"). Different types of data may be transmitted via different protocols, or the same types of data may be transmitted via different protocols.

The system 100 can include at least one data processing system 102. The data processing system 102 can include at least one logic device such as a computing device having a processor to communicate via the network 105, for example with the computing device 104, or the data provider device 108. The data processing system 102 can include at least one computation resource, server, processor, or memory. For example, the data processing system 102 can include a plurality of computation resources or servers located in at least one data center. The data processing system 102 can include multiple, logically-grouped servers and facilitate distributed computing techniques. The logical group of servers may be referred to as a data center, server farm, or machine farm. The servers can also be geographically dispersed. A data center or machine farm may be administered as a single entity, or the machine farm can include a plurality of machine farms. The servers within each machine farm can be heterogeneous—one or more of the servers or machines can operate according to one or more type of operating system platform.

Servers in the machine farm can be stored in high-density rack systems, along with associated storage systems, and located in an enterprise data center. For example, consolidating the servers in this way may improve system manageability, data security, the physical security of the system, and system performance by locating servers and high performance storage systems on localized high performance networks. Centralization of all or some of the data processing system 102 components, including servers and storage systems, and coupling them with advanced system management tools allows more efficient use of server resources, which saves power and processing requirements and reduces bandwidth usage.

The system 100 can include, access, or otherwise interact with at least one data provider device 108. The data provider device 108 can include at least one logic device such as a computing device having a processor to communicate via the network 105, for example with the computing device 104, or the data processing system 102. The data provider device 108 can include at least one computation resource, server, processor or memory. For example, data provider device 108 can include a plurality of computation resources or servers located in at least one data center. The data provider device 108 can include one or more component or functionality of the data processing system 102.

The computing device 104 can include, interface, or otherwise communicate with at least one interface 110, at least one natural language processor ("NLP") component 112, at least one data repository 118, at least one mode detector component 114, or at least one fetching component 116. The computing device 104 can also include, interface, or otherwise communicate with at least one display device 128, sensor 130, speaker 132, or remote controller device 134. The computing device 104 can interface or communicate with these components via a wired or wireless communication technique.

The display device 128 can include one or more components or functionalities of display 435 depicted in FIG. 4. The sensor 130 can include, for example, a microphone, an ambient light sensor, proximity sensor, temperature sensor, accelerometer, gyroscope, motion detector, GPS sensor, location sensor, or touch sensor. The speaker 132 can include a transducer, loudspeaker, or apparatus that converts electrical or magnetic impulses into sound. The computing device 104 can include an interface 110 comprising an audio driver that provides a software interface to the hardware speaker 132. The audio driver of the interface 110 can execute an audio file or audio stream or other instructions provided by a component of the computing device 104 or the data processing system 102 to control the speaker 132 to generate a corresponding acoustic wave or sound wave.

The interface 110 can be designed, configured, constructed, or operated to receive and transmit information using, for example, data packets. The interface 110 can receive and transmit information using one or more protocols, such as a network protocol. The interface 110 can include a hardware interface, software interface, wired interface, or wireless interface. The interface 110 can include or provide a graphical user interface or voice interaction interface. The interface 110 can render graphical output via display device 128. The interface 110 can facilitate translating or formatting data from one format to another format. For example, the interface 110 can include an application programming interface that includes definitions for communicating between various components, such as software components.

The remote controller device 134 can refer to a wireless controller device or other device that controls an aspect or function of the computing device 104 or otherwise communicates with the computing device 104 or data processing system 102. For example, the remote controller device 134 can include one or more circuits, a wireless module, transmitter, a power source, an input interface (e.g., input device 430 depicted in FIG. 4) and one or more sensors (e.g., sensor 130) to receive an input and provide an indication of the input to the computing device 104 or data processing system 102. The remote controller device 134 can receive input via buttons, switches, touch interface, or gestures. In some cases, the remote controller device 134 can be a stand-alone remote control that is operational to communicate or control the computing device 104. In some cases, the remote controller device 134 can refer to a software application executed on a type of computing device, where the software application is configured to communicate with the computing device 104 or data processing system 102. For example, the remote controller device 104 can include an application executed by a smartphone, tablet, smartwatch, or tablet.

The computing device 104 can include an NLP component 112 configured to detect a keyword and perform an action based on the keyword. The NLP component 112 can filter out one or more terms or modify the terms prior to transmitting the terms to the data processing system 102 for further processing. The NLP component 112 of or executed by the computing device 104 can be referred to as a local NLP component or client-side NLP component. The NLP component 112 of the computing device 102 can convert analog audio signals detected by the microphone into a digital audio signal and transmit one or more data packets carrying the digital audio signal to the data processing system 102 via the network 105. In some cases, the NLP component 112 can transmit data packets carrying some or all of the input audio signal responsive to detecting an instruction to perform such transmission. The instruction can include, for example, a trigger keyword, hotword, or other keyword or approval to transmit data packets comprising the input audio signal to the data processing system 102 for further processing by the NLP component 112 of the data processing system 102, which can be referred to as the server NLP component or cloud NLP component.

The client computing device 104 can be associated with an end user that enters voice queries as audio input into the client computing device 104 (e.g., via the sensor 130) and receives audio output in the form of a computer generated voice that can be provided from the data processing system 102 (or the data provider computing device) to the client computing device 104 and is output from the speaker 132. The computer generated voice can include recordings from a real person or computer generated language.

The data repository 118 can include one or more local or distributed databases, and can include a database management system. The data repository 118 can include computer data storage or memory and can store one or more prefetch parameter data structures 120 and corresponding values, one or more mode data structures 122, template data structures 124, and electronic content item data structures 126, among other data. The prefetch parameter data structure 120 (or data files) can include rules, logic, values, thresholds, points or other data that facilitates prefetching data from various sources in order to reduce latency, such as latency in rendering graphical data output. Prefetch parameter data structure 120 (or data files) can include one or more values, such as an amount of data to prefetch, types of data to prefetch, a number of electronic content items to prefetch, from where to prefetch data (e.g., a storage location for the prefetched data, such as memory, main memory, cache, or memory address). The mode data structure 122 (or data files) can refer to types of interaction modes of the computing device 102. Types of interaction mode can include, for example, voice-only interaction mode, remote controller device interaction mode, three-dimensional gesture mode, eye tracking mode, or combinations thereof. The mode 122 can include rules, logic, condition, events or triggers used to enter or switch from one mode to another. The mode data structure 122 can include a default mode.

The template 124 can include a template, form, rules, or other structure for rendering or populating a graphical user template. The template 124 can include logic for selecting a template responsive to an interaction mode. The electronic content items 126 can include content items for visual output on display device 128, audio output on speaker 132, or associated metadata or multimedia content. The electronic content items 126 can include media titles, movies, television programs, videos, audio, online documents, images, animations, or other content.

The interface 110, NLP component 112, mode detector component 114, and fetching component 116 can each include at least one processing unit or other logic device such as programmable logic array engine or module configured to communicate with the database repository or database 118. The interface 110, NLP component 112, mode detector component 114, fetching component 116 and data repository 118 can be separate components, a single component, or part of the computing device 104. The system 100 and its components, such as a computing device 104, can include hardware elements, such as one or more processors, logic devices, or circuits.

The data processing system 102 can include, interface, or otherwise communicate with at least one NLP component 112. The NLP component 112 of the data processing system can be referred to as the data processing system NLP component, the server NLP component or cloud NLP component. The data processing system 102 can include, interface, or otherwise communicate with at least one content selector component 138. The data processing system 102 can include, interface, or otherwise communicate with at least one audio signal generator 136. The data processing system 102 can include, interface, or otherwise communicate with at least one data repository 140. The at least one data repository 140 can include or store, in one or more data structures or databases, electronic content items 126. The data repository 140 can include one or more aspects or functionalities of data repository 118. The data repository 118 can include data received from data repository 140. For example, the electronic content items 126 stored in data repository 118 (e.g., referred to as "local data repository") can include a subset of electronic content items 126 stored in data repository 140. In some cases, the content selector component 138 can select electronic content items 126 from data repository 140 and provide the selected subset of electronic content items for storage in the client data repository 118 on the computing device.

The NLP component 112, audio signal generator component 136, or content selector component 138 can each include at least one processing unit or other logic device such as programmable logic array engine, or module configured to communicate with the database repository or database 140. The NLP component 112, audio signal generator component 136, or content selector component 138 and data repository 140 can be separate components, a single component, or part of the data processing system 102. The system 100 and its components, such as a data processing system 102, can include hardware elements, such as one or more processors, logic devices, or circuits.

The data processing system 102 can obtain anonymous computer network activity information associated with a plurality of computing devices 104. A user of a computing device 104 can affirmatively authorize the data processing system 102 to obtain network activity information corresponding to the user's computing device 104. For example, the data processing system 102 can prompt the user of the computing device 104 for consent to obtain one or more types of network activity information. The identity of the user of the computing device 104 can remain anonymous, and the computing device 104 can be associated with a unique identifier (e.g., a unique identifier for the user or the computing device provided by the data processing system or a user of the computing device). The data processing system can associate each observation with a corresponding unique identifier.

The data processing system 102 can include an application, script, or program installed at the client computing device 104, such as an app to communicate input audio signals to the interface 110 of the computing device 104 and to drive components of the client computing device to render output audio signals. The data processing system 102 can receive data packets or other signal that includes or identifies an audio input signal. For example, the data processing system 102 can execute or run the NLP component 112 to receive or obtain the audio signal and parse the audio signal. For example, the NLP component 112 can facilitate interactions between a human and a computer. The NLP component 112 can be configured with techniques for understanding natural language and allowing the data processing system 102 to derive meaning from human or natural language input. The NLP component 112 can include or be configured with techniques based on machine learning, such as statistical machine learning. The NLP component 112 can utilize decision trees, statistical models, or probabilistic models to parse the input audio signal. The NLP component 112 can perform, for example, functions such as named entity recognition (e.g., given a stream of text, the component can determine which items in the text map to proper names, such as people or places, and what the type of each such name is, such as person, location, or organization), natural language generation (e.g., convert information from computer databases or semantic intents into understandable human language), natural language understanding (e.g., convert text into more formal representations such as first-order logic structures that a computer module can manipulate), machine translation (e.g., automatically translate text from one human language to another), morphological segmentation (e.g., separating words into individual morphemes and identify the class of the morphemes, which can be challenging based on the complexity of the morphology or structure of the words of the language being considered), question answering (e.g., determining an answer to a human-language question, which can be specific or open-ended), and semantic processing (e.g., processing that can occur after identifying a word and encoding its meaning in order to relate the identified word to other words with similar meanings).

The NLP component 112 converts the audio input signal into recognized text by comparing the input signal against a stored, representative set of audio waveforms (e.g., in the data repository 124) and choosing the closest matches. The set of audio waveforms can be stored in data repository 124 or other database accessible to the data processing system 102. The representative waveforms are generated across a large set of users and then may be augmented with speech samples from the user. After the audio signal is converted into recognized text, the NLP component 112 matches the text to words that are associated, for example, via training across users or through manual specification, with actions that the data processing system 102 can serve.

The audio input signal can be detected by the sensor 130 of the client computing device 104. The client computing device 104 can provide the audio input signal to the data processing system 102 (e.g., via the network 105) where it can be received and provided to the NLP component 112 or stored in the data repository 140 for further processing. The client computing device 104 can provide only a portion of the audio input signal. For example, the client computing device 104 can execute the local NLP component 112 to detect a trigger word or hotword. A hotword can refer to a keyword or phrase that wakes up the computing device 104 or initiates a function of the computing device 104. The hotword can refer to a script or module of the NLP 112 of the computing device 104 that is configured to listen for specific keyword words chosen to activate a voice interface. Upon detection of the hotword, the system is readied for a voice-based search, questions, or commands. The computing device 104 can then transmit, to the data processing system 102, the audio input subsequent to the hotword. The client computing device 104 can terminate the audio transmission upon detecting a pause or session break in the audio input of a predetermined time interval (e.g., one second, two seconds, three seconds, or four seconds or five seconds).

The NLP component 112 can obtain the input audio signal. From the input audio signal, the NLP component 112 can identify at least one request or at least one trigger keyword corresponding to the request. The request can indicate intent or subject matter of the input audio signal. The trigger keyword can indicate a type of action likely to be taken. For example, the NLP component 112 can parse the input audio signal to identify at least one request to leave home for the evening to attend dinner and a movie. The trigger keyword can include at least one word, phrase, root or partial word, or derivative indicating an action to be taken. For example, the trigger keyword "find" or "what are some" from the input audio signal can indicate a need to perform a search. In this example, the input audio signal (or the identified request) does not directly express an intent for transport, however the trigger keyword indicates that transport is an ancillary action to at least one other action that is indicated by the request.

The NLP component 112 can parse the input audio signal to identify, determine, retrieve, or otherwise obtain the request and the trigger keyword. For instance, the NLP component 112 can apply a semantic processing technique to the input audio signal to identify the trigger keyword or the request. The NLP component 112 can apply the semantic processing technique to the input audio signal to identify a trigger phrase that includes one or more trigger keywords, such as a first trigger keyword and a second trigger keyword. For example, the input audio signal can include the sentence "find new action movies." The NLP component 112 can apply a semantic processing technique or other natural language processing technique to the data packets comprising the sentence to identify trigger phrases and keywords thereof, such as "find" and "new action movies." The NLP component 112 can further identify multiple trigger keywords, such as "new," "action," and "movies." For example, the NLP component 112 can determine that the trigger phrase includes the trigger keyword and a second trigger keyword.

The data processing system 102 can include, execute, or otherwise communicate with a content selector component 138 to receive the keyword or keywords identified by the NLP component 112 and select, based on the keyword or keywords, one or more electronic content items via a real-time content selection process. The content selection process can refer to or include performing a lookup in a data repository 140 for electronic content items that match the keyword or keywords, or querying a data provider device 108 for electronic content items corresponding to the keyword or keywords. The real-time content selection process can include a service in which content items provided by multiple data providers are parsed, processed, weighted, or matched in order to select one or more content items to provide to the computing device 104. The content selector component 138 can perform the content selection process in real-time. Performing the content selection process in real-time can refer to performing the content selection process responsive to the request for content received via the client computing device 104. The real-time content selection process can be performed (e.g., initiated or completed) within a time interval of receiving the request (e.g., 5 seconds, 10 seconds, 20 seconds, 30 seconds, 1 minute, 2 minutes, 3 minutes, 5 minutes, 10 minutes, or 20 minutes). The real-time content selection process can be performed during a communication session with the client computing device 104 or within a time interval after the communication session is terminated.

For example, the data processing system 102 can include a content selector component 138 designed, constructed, configured or operational to select content item objects. To select content items for display in a voice-based environment, the data processing system 102 (e.g., via NLP component 112) can parse the input audio signal to identify keywords (e.g., a trigger keyword), and use the keywords to select a matching content item based on a broad match, exact match, or phrase match. For example, the content selector component 138 can analyze, parse, or otherwise process subject matter of candidate content items to determine whether the subject matter of the candidate content items correspond to the subject matter of the keywords or phrases of the input audio signal detected by the microphone of the client computing device 104. The content selector component 138 may identify, analyze, or recognize voice, audio, terms, characters, text, symbols, or images of the candidate content items using an image processing technique, character recognition technique, natural language processing technique, or database lookup. The candidate content items may include metadata indicative of the subject matter of the candidate content items, in which case the content selector component 138 may process the metadata to determine whether the subject matter of the candidate content item corresponds to the input audio signal.

The data processing system 102 can receive, via a computer network, a request for content for presentation on a computing device 104. The data processing system 102 can identify the request by processing an input audio signal detected by a microphone of the client computing device 104. The request can include selection criteria of the request, such as the device type, location, and a keyword associated with the request.

Responsive to the request, the data processing system 102 can select one or more electronic content items (e.g., content item objects) from data repository 140 or a database associated with the data provider 108 and provide the electronic content items for presentation via the computing device 104 via network 105. In some cases, the electronic content item objects can be retrieved from the local data repository 118. The computing device 104 can interact with the content item object. The computing device 104 can receive an audio response to the content item. The computing device 104 can receive an indication to select a button, hyperlink, or other widget associated with the content item object that causes or allows the computing device 104 to perform a function associated with the electronic content item object.

The data processing system 102 can include, execute, or communicate with an audio signal generator component 122 to generate an output signal. The output signal can include one or more portions. For example, the output signal can include a first portion and a second portion. The first portion of the output signal can correspond to the action data structure. The second portion of the output signal can correspond to the content item selected by the content selector component 138 during the real-time content selection process.

The computing device 104 can receive an acoustic signal or audio input signal that carries a query. The computing device 104 can detect the acoustic signal sensor 130 (e.g., a microphone). The query can include, for example, "find new action movies" or "what are some good action movies" or "search for most popular action movies." To efficiently manage latency in graphically outputting the results of the query, the computing device 102 can determine an interaction mode of the computing device.

The computing device 104 can include a mode detector component 114 designed and constructed to determine an interaction mode of the computing device 104 or an interaction mode of a graphical user interface provided by the interface 110 of the computing device 104. The types of interaction modes can include, for example, voice-only interaction mode, remote controller device interaction mode, three-dimensional gesture mode, eye tracking mode, or combinations thereof.

To determine the interaction mode of the computing device 104, the mode detector component 114 can use one or more rules, policies, or logic. The mode detector component 114 can determine the interaction mode based on available or active interfaces 110. The mode detector component 114 can determine the interaction mode based on external factors. For example, the mode detector component 114 can determine the interaction mode by polling one or more interfaces or devices associated with the computing device 104. The mode detector component 114 can poll one or more wireless controller devices 134 to determine a state of the wireless controller device 134. States can include active state, or standby state. If the computing device 104 doesn't get a response to the poll from the wireless computing device 134, the mode detector component 114 can determine the state of the wireless controller device 134 to be in a first state or a second state. For example, the states can be standby, inactive, or off. The state can be a default state.

The mode detector component 114 can determine the state of the wireless controller device 134 with or without polling the wireless controller device 134. For example, the mode detector component 114 can determine a last indication or communication from the wireless controller device 134. The mode detector component 114 can identify a timestamp associated with the last indication or communication from the wireless controller device 134. If the timestamp of the last or previous communication from the wireless controller device 134 is greater than a threshold time stamp (e.g., 30 seconds, 1 minute, 5 minutes, or 10 minutes).

The mode detector component 114 can initially determine the state of the wireless controller device to be a default state, such as off or standby or not in use. The mode detector component 114 can determine a change from the first state to a second state responsive to receiving an indication from the wireless controller device 134. For example, responsive to receiving an acoustic signal carrying the query, the mode detector component 114 can determine the state of the wireless controller device 134 to be a default state, such as inactive, without polling the wireless controller device 134. By not polling the wireless controller device 134 and setting the state to a predetermined or default state, the mode detector component 114 can reduce the utilization of limited resources of the wireless controller device 134, such as saving the battery of the wireless controller device 134. The mode detector component 114 can then receive an indication or communication from the wireless controller device 134, such as input from a user of the wireless controller device 134 or movement of the wireless controller device 134 as sensed by an accelerometer of the wireless controller device 134. Responsive to the indication from the wireless controller device 134, the mode detector component 114 can determine the state to be a second state.

Prior to determining that the state of the wireless controller device 134 is in a second state (e.g., an active state or in-use state), the mode detector component 114 can determine the state of the wireless controller device 134 to be in a first state or inactive state. The mode detector component 114 can establish an interaction mode of the computing device 104. The mode detector component 114 can establish the interaction mode as a first interaction mode. The mode detector component 114 can establish the interaction mode as the first interaction mode based on receipt of the acoustic signal and the determination that the wireless controller device is in the first state. For example, the mode detector component 114 can determine that the voice-interface of the computing device 104 is available based on receiving the acoustic signal carrying the query. In some cases, the mode detector component 114 can determine the voice interface of the computing device 104 is available and has been triggered based on identifying a hotword or trigger keyword in the acoustic signal.

The mode detector component 114 can determine the first state of the wireless controller device 134 based on an absence of a signal from the wireless controller device 134 in a predetermined time interval prior to detection of the acoustic signal. The predetermined time interval can be, for example, 1 second, 2 seconds, 3 seconds, 5 seconds, 10 seconds, 30 seconds, 1 minute, 2 minute, 5 minutes, or more. The signal can be a communication from the wireless controller device 134, such as a radio frequency signal, infrared signal, wireless signal, WI-FI signal, or short-range wireless interconnection signal (e.g., Bluetooth). The mode detector component 114 can determine, based on the absence of the signal and the presence of the acoustic signal, to set the interaction mode to a first interaction mode corresponding to a voice-interface. The absence can refer to not receiving the signal or nonexistence of the signal during the predetermined time period prior to receiving the acoustic signal.

The mode detector component 114 can establish the first interaction mode for a graphical user interface rendered by the computing device 104 for display via the display device. For example, the mode detector component 114 can establish a voice-interaction mode for the graphical user interface rendered by the computing device 104. The mode detector component 114 can access the template data structure 124 stored in data repository to retrieve a template user interface configured for the voice-interaction mode. The template for the user interface for the voice-interaction mode can provide one or more attributes for the voice-interaction mode, or one or more functions to enable in voice-interaction mode. The template can include attributes such as font, size, position, layout, cards, animations, or number of items to display. For example, the voice-interaction template can include a one-dimensional display of electronic content items, such as a single row or column of electronic content items as depicted in block 212 in FIG. 2.

Thus, the mode detector component 114 can determine the interaction mode to establish for the computing device 104, or graphical user interface thereof, based on one or more states or characteristics associated with the computing device 104. The mode detector 114 can modify, change, or alter the interaction mode based on one or more events, triggers, commands, or instructions. For example, the mode detector component 114 can determine a change in state of the wireless controller device 134. Responsive to determine a change in the state, the mode detector component 114 can determine to change the interaction mode of the computing device 104. For example, if the mode detector component 114 determines that the wireless controller device 134 is active, in-use, or accessible to a user, then the mode detector component 114 can change the interaction mode to a wireless device control mode or a combined voice and wireless control device mode.

The mode controller component 114 can be configured with different wireless device control modes based on different types of wireless controller devices 134. The mode detector component 114 can set different interaction modes based on the type of wireless controller device. Types of wireless device control mode can be based on types of inputs or interfaces available to a wireless controller device 134. For example, the mode detector component 114 can establish a first wireless control mode for a wireless controller device 134 with a touch interface, a second wireless control mode for a wireless controller device 134 with a button input, a third wireless control mode for a wireless controller device 134 with a gesture interface, a fourth wireless control mode for a wireless controller device 134 with a keyboard, or a fifth wireless control mode for a wireless controller device 134 with a mouse. In other examples, the mode controller component 114 can establish a different interaction mode for a three-dimensional gesture mode.

Based on the interaction mode established for the computing device 104, the computing device 104 can adjust, modify, or set one or more parameters to reduce latency in graphical output. The computing device can set the prefetch parameter to a first value based on the graphical user interface in the first interaction mode or the template selected for the graphical user interface based on the first interaction mode. The computing device 104 can set one or more parameters to optimize or improve the efficiency of the graphical output or graphical user interface.

The computing device 104 can include, access or otherwise communicate with a fetching component 116 designed and constructed to fetch or prefetch electronic content items or associated data in accordance with one or more parameters, such as a prefetch parameter. The fetching component 116 can use one or more parameters, such as a prefetch parameter stored in a prefetch parameter data structure 120 in data repository 118, to determine a fetching technique or an amount of electronic content items to fetch or prefetch.

The fetching component 116 can perform a lookup in the prefetch parameter data structure 120 using the interaction mode to determine an amount of electronic content items to prefetch. The amount can refer to a number of electronic content items, a data size (e.g., file size or memory size), a resolution, a size on the display screen, or other quantity or extent. The number of electronic content items can be a numerical value, such as one, two, three, four, five, or more. The number of electronic content items can be a relative value, such as a percentage (e.g., 10%, 25%, 50%, or 75%) of the number of electronic content items currently being rendered or capable of being rendered based on the template used to generate the graphical user interface. For example, if the currently used template, selected based on the interaction mode, provides a layout for three electronic content items, then the prefetch parameter can indicate to prefetch a third of the number of electronic content items for the template, which can be one electronic content item.

In some cases, the value of the prefetch parameter can be set based on network characteristics, display device characteristics (e.g., resolution or number of pixels), processor characteristics, available memory characteristics, or interaction mode characteristics (e.g., how quickly a user can scroll or paginate through electronic content items, such as one-by-one, or paginate). For example, if the network 105 used by the computing device 104 to communicate with a data processing system 102 or data provider device 108 has a high bandwidth and low latency, then the value of the prefetch parameter may be higher because the computing device 104 may be able to receive a greater number of electronic content items without increasing latency in the graphical output in the event the user scrolls or paginates. In some cases, however, if the network 105 used by the computing device 104 to communicate with data processing system 102 or data provider device 108 has a high bandwidth and low latency, but the computing device 104 has limited available memory, then the value of the prefetch parameter may be lower because while the computing device 104 may be able to receive a greater number of electronic content items without increasing latency, the computing device 104 may not have sufficient memory available, thereby increasing latency in processing or other functions.

The fetching component 116 can then prefetch an amount of electronic content items corresponding to the first value. The fetching component 116 can prefetch the amount of electronic content items based on or responsive to the query and the value set for the prefetch parameter. Prefetching can refer to transferring data from a first memory or storage device to a second memory or storage location in readiness for later use. Prefetching can refer to transferring the data from memory before receiving a request to provide or render the data via the graphical user interface. For example, the computing device 104 can receive a request from a user for electronic content items. The computing device 104 can then request a first set of electronic content items for rendering on the graphical display. The computing device 104 can prefetch a second set of electronic content items by requesting a second set of electronic content items before or prior to receiving an indication from the user to display additional electronic content items beyond the first set of electronic content items being displayed. For example, the computing device 104 can prefetch the second set of electronic content items before the user scrolls the list of electronic content items being displayed.

Prefetching allows for the data to be available faster so that the data can be rendered on the graphical display responsive to an interaction without delay or latency or with reduced delay or reduced latency. For example, if the graphical user interface is displaying three electronic content items in response to a query (e.g., three electronic content items or icons for three different action movies), then the computing device 104 can prefetch one or more electronic content items in the event the user scrolls down the last or requests to view the next sequence of electronic content items. Prefetching this data allows the computing device 104 to graphically display the additional electronic content items without waiting to query the data processing system 102 for the next set of electronic content items or have to retrieve the electronic content items from a hard drive or storage location with a slower read speed. For example, the computing device 104 can prefetch data from a main memory with a slower read/write speed and temporarily store the data in a cache memory with a faster read speed.

The computing device 104 can prefetch a subset of electronic content items from data repository 140 and store them in data repository 126. The subset of electronic content items can be responsive to the query (e.g., action movies). The computing device 104 can prefetch by transferring electronic content items from a slower memory of the computing device 104 to a faster memory of the electronic content items. Prefetching can include pre-processing the data or a file corresponding to the electronic content items such to improve readiness for rendering or graphically outputting. For example, prefetching can include uncompressing the data, decrypting the data, or loading or retrieving additional data objects, templates, or images associated with the electronic content item.

The computing device 104 (e.g., via mode detector component 114) can determine that the mode of interaction of the computing device 104 changed. The mode detector component 114 can monitor interfaces, periodically poll (e.g., every 0.5 seconds, 1 second, 2 seconds, etc.) wireless controller device 134, or receive an indication of a state or change in state of the wireless controller device 134. For example, a user may pick up the wireless controller device 134 or activate the wireless controller device 134 by selecting a button on the wireless controller device 134 or interact with a touch interface of the wireless controller device 134. Responsive to detecting a change in the state of the wireless controller device 134 (e.g., from inactive to active), the mode detector 114 can decide to change the interaction mode of the computing device 104 (or graphical user interface provided by interface 110).

Thus, the first state of the wireless controller device can include a standby state, and the computing device can determine the wireless controller device entered the second state responsive to receipt of a signal transmitted by the wireless controller device. The signal can be transmitted responsive to a motion detected by an accelerometer of the wireless controller device or an input received by the wireless controller device.

The computing device 104 can establish, based on detection of the wireless controller device in a second state different than the first state, a second interaction mode for the graphical user interface. The computing device 104 can determine the wireless controller device 134 is active and then change the interaction mode to a wireless controller device interaction mode. The mode detector component 114 can then change the graphical user interface to adapt to the second interaction mode. The mode detector component 114 can then change the graphical user interface to optimize the second interaction mode. The computing device 104 can provide different functions or features in the second interaction mode. For example, the computing device 104 can provide for scrolling through the list of electronic content items in the second interaction mode, whereas scrolling may be disabled in the first interaction mode.

The pagination mode can refer to a graphical user interface pattern that divides the electronic content items into separate pages. When a user requests additional content, the computing device 104 in pagination mode can replace the current display with a new display of electronic content items. Scrolling mode can refer to an action of moving displayed text or graphics from one position to another (e.g., up, down, left-to-right, or right-to-left) in order to view different parts of the electronic content items results responsive to the query.

To optimize resource utilization and reduce latency for the second interaction mode, the computing device 104 can use a different prefetch parameter. For example, if scrolling mode is provided in the second interaction mode, then the computing device 104 may prefetch fewer electronic content items since the scrolling mode may display one additional electronic content item at a time, as opposed to a pagination mode where the entire list of electronic content items is replaced with a new list of electronic content items, as in the first interaction mode. The fetching component 116 can perform a lookup in the prefetch parameter data structure 120 for a second value of the prefetch parameter. The fetching component 116 can override, responsive to establishment of the second interaction mode for the graphical user interface, the first value of the prefetch parameter with the second value different than the first value. The second value can be less than the first value, greater than the first value, or the same as the first value. In some cases, the second interaction mode can use a different prefetch parameter than the first interaction mode. For example, the second interaction mode may be a different graphical user interface with a different template, so the prefetch parameter may indicate a different type of quantity or amount to prefetch. The prefetch parameters can be customized for interaction modes, as well as the values thereof.

The computing device 104 can then use the prefetch parameter overridden to the second value to prefetch a second amount of electronic content items corresponding to the second value. If the computing device 104 had previously prefetched electronic content items in accordance with the first value of the prefetch parameter, the computing device 104 may have already prefetched sufficient electronic content items for the second interaction mode. However, upon displaying the additional electronic content items, the computing device 104 can then prefetch additional electronic content items in accordance with the second value of the prefetch parameter. If the second value is less than the first value, then the computing device 104 may initially not prefetch additional electronic content items because the computing device 104 had already prefetched sufficient electronic content items using the first value, in the event a request to display additional electronic content items responsive to the query was not yet received.

If the second value of the prefetch parameter is greater than the first value, then the computing device 104 can prefetch an amount of electronic content items based on the difference of the first value and the second value such that the total amount of prefetched electronic content items is equal to the second value. In some cases, the computing device 104 can replace, in memory, the first amount of prefetched electronic content items with the second amount of electronic content items.

Upon prefetching the electronic content items for storage in a local memory of the computing device, the computing device 104 can receive one a second acoustic signal or input from the wireless controller device. Responsive to the receive second acoustic signal or input, the computing device can retrieve, from the local memory, one or more of the electronic content items for display via the graphical user interface in accordance with the established interaction mode.

Figure 2:
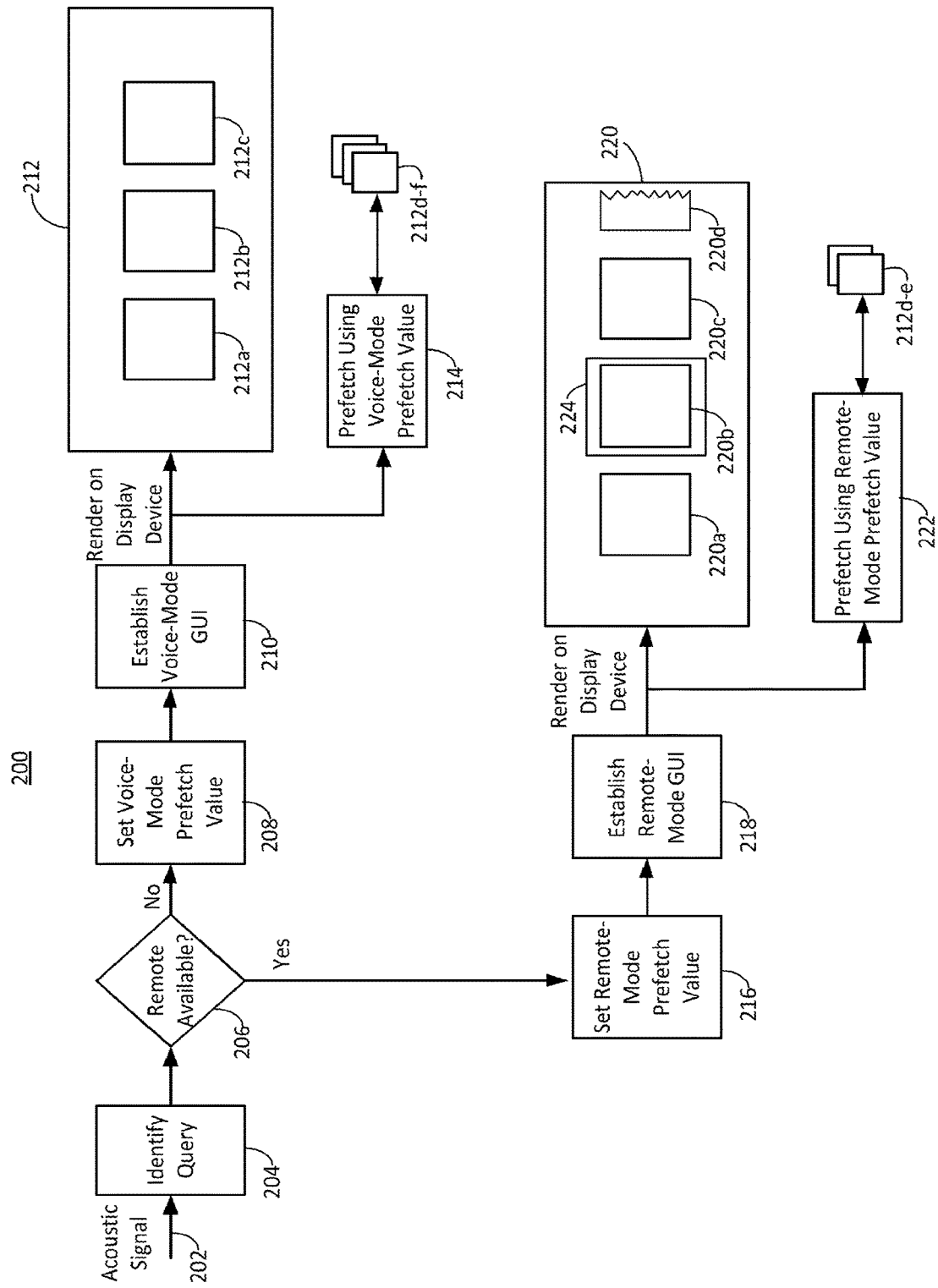
FIG. 2 is an illustration of an operation of a system to transfer data from memory to manage graphical output latency.

FIG. 2 is an illustration of an operation of a system to transfer data from memory to manage graphical output latency. The operation 200 can be performed by one or more system or component depicted in FIG. 1 and FIG. 4, including, for example, computing device 104, mode detector component 114, fetching component 116, interface 110, NLP component 112, or the data processing system 102. At ACT 202, a computing device can receive an acoustic signal. The acoustic signal can carry a query, such as "show me action movies." At ACT 204, the query can be identified. An NLP component can identify the query. The query can be identified by an NLP component of the data processing system or an NLP component of the computing device.

At ACT 206, the computing device determines whether a remote is available. The remote can refer to a wireless controller device operation to control a graphical user interface of the computing device. If the determination at ACT 206 is that the remote is not available or not in an active state at this time, then the operation 200 proceeds to ACT 208, at which the voice-mode value for a prefetch parameter is set. The computing device can also establish the voice-mode graphical user interface at ACT 210 and render the graphical user interface via a display device. Block 212 illustrates an example graphical user interface rendered for the voice-interaction mode. The voice-interaction mode graphical user interface 212 renders three electronic content items 212a, 212b, and 212c. The three electronic content items can be rendered in a one-dimensional manner, such as in a single row. At ACT 214, the computing device can prefetch electronic content items using the voice-mode prefetch value. For example, the voice-mode prefetch value can be three electronic content items. The computing device 104 can then prefetch three electronic content items by transferring electronic content items 212d-f from a main memory or a data processing system 102 to a local memory or faster speed memory on the computing device 104. The computing device 104 can make the three prefetched electronic content items 212d-f ready for future use, such as when the computing device receives a request to display electronic content items 212d-f.

If, however, at ACT 206 the computing device 104 determines the remote is available, the operation can proceed to ACT 216. In some cases, the operation 200 can return to ACT 206 from ACT 210 or ACT 214 responsive to detecting that the remote (e.g., wireless controller device 134) is available. At ACT 216, the computing device can set the remote-mode prefetch value. The remote-mode prefetch value can be different from the voice-mode prefetch value. The computing device can establish a remote-mode graphical user interface at ACT 218. The remote-mode graphical user interface ("GUI") can be optimized for, or otherwise facilitate, interacting with the graphical user interface using a wireless controller device 134. The computing device can then render the remote-mode GUI, as illustrated in example block 220. The remote-mode GUI can include content items 220a-c as in the voice-mode GUI 212. However, the remote-mode GUI can be different than the voice-mode GUI because the remote-mode GUI can be configured for a different interaction mode. The remote-mode GUI 220 can be different from the voice-mode GUI as follows: i) partial icon 220d; ii) focus mode 224; and iii) scrolling.

The remote-mode GUI can provide a partial icon 220d. The partial icon 220d can be a partial rendering of the electronic content item 220d. The partial icon can provide an indication via the GUI to a user that the list presented in GUI 220 is scrollable, as opposed to the list provided in GUI 212 which is configured for pagination. The partial icon 220d can be added by the computing device responsive to the graphical user interface established in the second interaction mode (e.g., remote interaction mode), and positioned at a boundary of the graphical user interface. The partial icon 220d can be added to the graphical user interface without changing the position of any of the plurality of electronic content items 220a-c displayed via the graphical user interface. For example, electronic content items 220a-c can be positioned at the same location on the display screen in both the voice-interaction mode GUI 212 as well as the remote-interaction mode GUI 220, thereby reducing the amount of change to the graphical user interface when switching from one interaction mode to another. The computing device 104 can generate or render the partial icon 220d to indicate that the list of electronic content items is scrollable via the wireless controller device 134. Thus, in the first interaction mode 212, the electronic content items can each be rendered as a full icon, whereas in the remote-interaction mode GUI 220, a partial icon of an electronic content item 220d can be added without changing a position of the full icons of the electronic content items 220a-c.

The remote-mode GUI can provide a focus mode. Focus mode can include highlighting or otherwise indicating which of the electronic content items 220a-220c is selected or selectable. The computing device can add, subsequent to, before, or simultaneously with addition of the partial icon, a focus indicator to one of the one or more electronic content items that remain. The focus indicator can be absent from the one or more electronic content items in the first interaction mode GUI 212. For example, the user can move a cursor or pointer to an electronic content item 220b, which can result in providing an indication such as a boundary or square 224 around the electronic content item 220b to indicate that is currently in focus or highlighted. Thereafter, a user can select the electronic content item 220b to play it by pressing a button or providing other input via the wireless controller device 134. The focus 220b can be absent from the voice-interaction mode GUI 212 because in a voice-interaction mode, a user can provide an acoustic command to select the desired electronic content item (e.g., "play electronic content item 212b").

The remote-interaction mode GUI 220 can provide for scrolling responsive to receiving input from the wireless controller device 134. Upon rendering the GUI 220, prior to rendering GUI 220, or in parallel to rendering GUI 220, the computing device can prefetch electronic content items using the remote-mode prefetch value at ACT 222. For example, the remote-mode prefetch value can be two electronic content items, and the computing device can prefetch electronic content items 212*d-e* to reduce graphical output latency responsive to scrolling in GUI 220.

Figure 3:
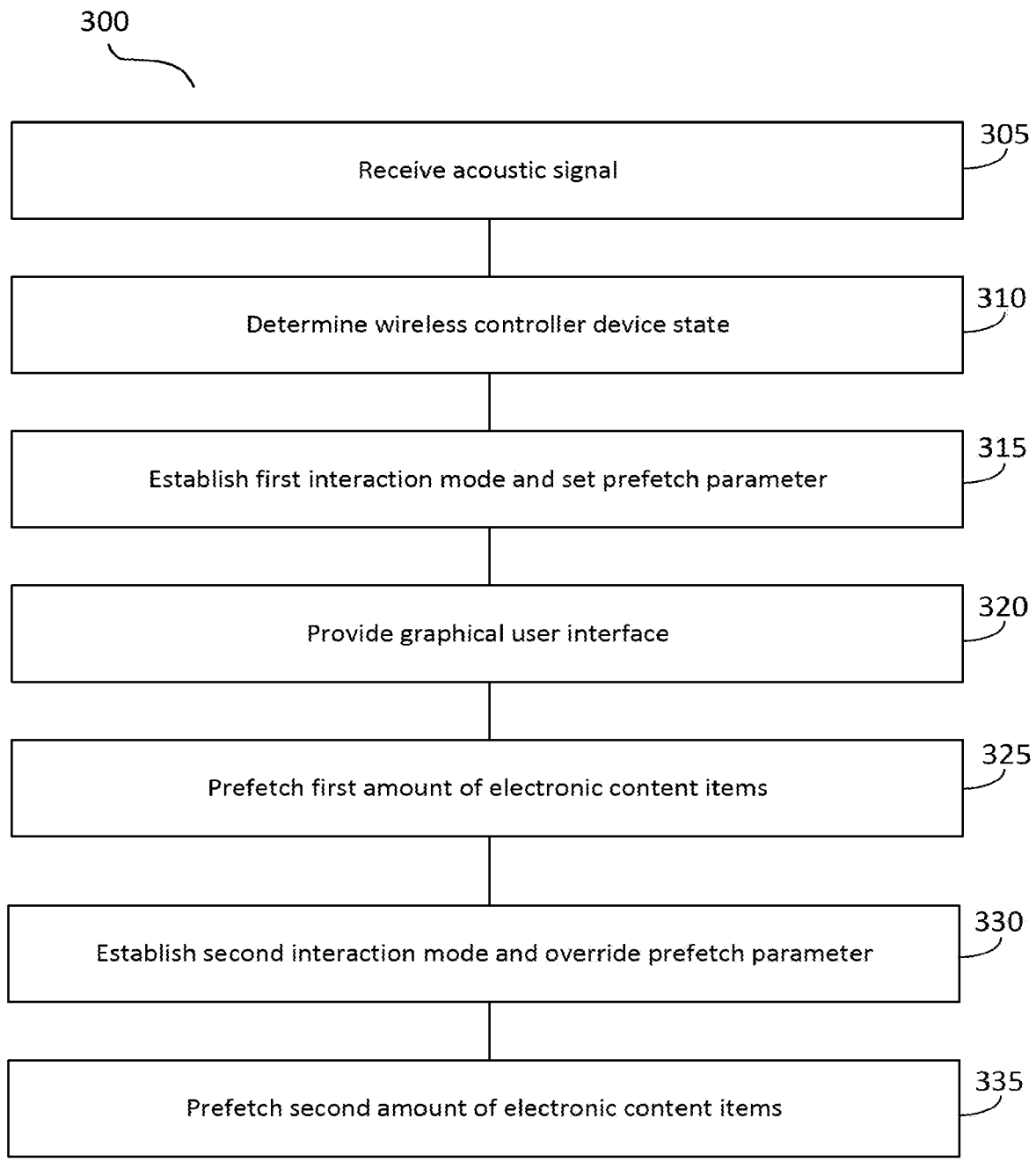
FIG. 3 is an illustration of a method of transferring data from memory to manage graphical output latency.

FIG. 3 is an illustration of a method of transferring data from memory to manage graphical output latency. The method 300 can be performed by one or more system or component depicted in FIG. 1 and FIG. 4, including, for example, computing device 104, mode detector component 114, fetching component 116, interface 110, NLP component 112, or the data processing system 102. At ACT 305, a computing device receives an acoustic signal. The computing device can sense or detect the acoustic signal using a microphone. The computing device can identify trigger word or a hotword in the acoustic signal. The computing device or a data processing system remote from the computing device can identify a query in the acoustic signal. In some cases, the computing device can receive the acoustic signal, determine that the acoustic signal is to be forward to a data processing system, and then forward the acoustic signal, or portion thereof, to the data processing system. The acoustic signal can include multiple portions. For example, a first portion of the acoustic signal can include a wake-up term, activation term, trigger word, or hotword that signals to the computing device that the user is requesting an action, function, or information. The computing device can use a local NLP component to identify the activation term. The computing device can receive a second portion of the acoustic signal subsequent to identifying the activation term. This second portion of the acoustic signal can be forwarded to a data processing system for further processing. The data processing system can identify the query in the second portion of the acoustic signal received by the data processing system. The computing device can parse or process the acoustic signal to identify the query.

At ACT 310, the computing device can determine a wireless controller device state. The computing device can determine that the wireless controller device operational to control the computing device is in a first state. The computing device, to reduce latency, can determine the wireless controller device state prior to receiving the acoustic signal, in parallel with receiving the acoustic signal, subsequent to receiving the acoustic signal but while transmitting the acoustic signal to a data processing system to identify the query, or in parallel with or while awaiting a response from the data processing system to the query. The computing device can determine the wireless controller device state by performing a lookup in a data repository to identify a default state for the wireless controller device. The computing device can determine the wireless controller device state based on a policy, such as whether the computing device received any communication from the wireless controller device within a predetermined time interval prior to receiving the acoustic signal. The computing device can determine the state of the wireless controller device based on an absence of a signal from the wireless controller device in a predetermined time interval prior to detection of the acoustic signal. The computing device can determine the state of the wireless controller by polling or pinging the wireless controller device. The computing device can use a wireless protocol to ping or poll the wireless controller device. The computing device can broadcast a signal to determine a state of the wireless controller device. For example, the computing device can send out an inquiry request, and if the wireless controller device is listening for such a request, the wireless controller device can respond with an address, name, or additional information. In some cases, the wireless controller device can send the inquiry request, and the computing device can be listening for such a request and respond with the address, name, or other information of the computing device.

At ACT 315, the computing device can establish a first interaction mode and set a prefetch parameter. The computing device can establish the first interaction mode for the computing device. The computing device can establish the first interaction mode for the graphical user interface provided by the computing device. The computing device can use a rule or policy to select the first interaction mode. The computing device can use a mode detector component configured with rules, policies, or heuristics to select the interaction mode to establish based on one or more inputs or factors. For example, the computing device can determine to establish the first interaction mode based on the interfaces currently available or active, such as the voice-interface, and the interfaces that are unavailable or in-active, such as a wireless controller device. For example, the computing device can establish the first interaction mode of the graphical user interface based on an absence of a signal from the wireless controller device in a predetermined time interval prior to detection of the acoustic signal.

The computing device can set, based on the graphical user interface being in the first interaction mode, a prefetch parameter to a first value. The prefetch parameter can be set to facilitate rendering the graphical output of the graphical user interface with reduced latency, delay, real-time processing, or other resource utilization. The prefetch parameter can be a predetermined prefetch parameter or a dynamically generated prefetch parameter using one or more rules or processes. For example, the computing device can include or have access to a mapping of interaction modes to prefetch parameters and select the prefetch parameter to use based on the current interaction mode of the computing device or graphical user interface. In another example, the computing device can use a rule or policy to determine the prefetch parameter to use based on the interaction mode and additional characteristics associated with current network characteristics, processor utilization, memory utilization, display resolution, or type of electronic content items. For example, if the current network bandwidth is high, and the network latency is low, but there is limited memory available, the computing device can determine to use a low prefetch parameter value, such as one or two, because the computing device can determine that the network has sufficient bandwidth and latency to quickly provide additional electronic content items, and that reducing memory usage can allow for application or processes executing on the computing device to execute smoothly.

At ACT 320, the computing device can provide the graphical user interface for display via a display device. The computing device can configure the graphical user interface with the first interaction mode, such as a voice-interaction mode. Configuring the graphical user interface with the first interaction mode can refer to selecting a layout that facilitates voice-interaction, such as a one-dimensional structure of electronic content items. Display elements or features that are not available or easy to use in a voice-interaction mode can be removed or disabled in graphical user interface, so as to further reduce computing resource utilization and manage latency in rendering graphical output.

At ACT 325, the computing device can prefetch a first amount of electronic content items. The computing device can prefetch, responsive to the query and the prefetch parameter, a first amount of electronic content items corresponding to the first value of the prefetch parameter. The computing device can transfer the amount of electronic content items from a first memory location to a second memory location so the electronic content items are ready for rendering via the graphical user interface should the electronic content items be requested for display. The computing device can prefetch by requesting the electronic content items from a data processing system or data provider and then storing the received electronic content items in memory. The computing device can also prefetch by pre-processing (e.g., applying a layout, font, size, colors, or uncompressing or decrypting) the electronic content items.

At ACT 330, the computing device can establish a second interaction mode and override the first value of the prefetch parameter. The computing device can determine the state of the wireless controller device has changed from an inactive state to an active state or available state. Responsive to detecting the change in state of the wireless controller device, the computing device can change the interaction mode of the graphical user interface. The computing device can establish, responsive to detecting that the wireless controller device entered a second state different than the first state, a second interaction mode for the graphical user interface. The second interaction mode can facilitate interacting or interfacing with the graphical user interface using the wireless controller device. In the second interaction mode, the computing device can enable features or functions of the graphical user interface that may have been disabled in the voice-interaction mode. In the second interaction mode, the computing device can provide different layout or functions than the voice-interaction mode. For example, in the wireless controller device interaction mode, the computing device can provide a scrollable list and an indication that the list is scrollable. In another example, the computing device can provide a focus icon to highlight which electronic content item is currently selectable by the wireless controller device.

At ACT 335, the computing device can prefetch a second amount of electronic content items. The computing device can prefetch, responsive to the prefetch parameter overridden to the second value, a second amount of electronic content items corresponding to the second value. In some cases, the computing device can determine which electronic content items were already prefetched in the first interaction mode and determine which electronic content items to prefetch without redundancy. In some cases, upon switching to the second interaction mode and second prefetch parameter, the computing device can erase or remove the previously prefetched content items in the first interaction mode and then prefetch the full second amount of electronic content items. In some cases, upon switching to the second interaction mode and second prefetch parameter, the computing device can erase or remove the previously prefetched content items that exceed the second amount of electronic content items in order to reduce memory utilization in the second interaction mode.

In the second interaction mode, the computing device can also prefetch the electronic content item that is currently in focus. Thus, if the in-focus electronic content item is selected, the computing device can have the data file or media content corresponding to in-focus electronic content item ready for rendering or playback. The computing device can perform a prefetch routine as each electronic content item goes in-focus. For example, the computing device can perform a first prefetch routine to manage latency in scrolling through the list of electronic content items and a second prefetch routine to manage latency in playing the in-focus electronic content item should the user select the in-focus electronic content item.

FIG. 4 is a block diagram of an example computing system 400. The computer system or computing device 400 can include or be used to implement the system 100 or its components such as the computing device 104 or data processing system 102. The computing device 104 or data processing system 102 can include an intelligent personal assistant or voice-based digital assistant. The computing system 400 includes a bus 405 or other communication component for communicating information and a processor 410 or processing circuit coupled to the bus 405 for processing information. The computing system 400 can also include one or more processors 410 or processing circuits coupled to the bus 405 for processing information. The computing system 400 also includes main memory 415, such as a random access memory (RAM) or other dynamic storage device, coupled to the bus 405 for storing information, and instructions to be executed by the processor 410. The main memory 415 can be or include the data repository 140 or data repository 118. The main memory 415 can also be used for storing position information, temporary variables, or other intermediate information during execution of instructions by the processor 410. The computing system 400 may further include a read-only memory (ROM) 420 or other static storage device coupled to the bus 405 for storing static information and instructions for the processor 410. A storage device 425, such as a solid state device, magnetic disk, or optical disk, can be coupled to the bus 405 to persistently store information and instructions. The storage device 425 can include or be part of the data repository 140 or data repository 118.

The computing system 400 may be coupled via the bus 405 to a display 435, such as a liquid crystal display or active matrix display, for displaying information to a user. An input device 430, such as a keyboard including alphanumeric and other keys, may be coupled to the bus 405 for communicating information and command selections to the processor 410. The input device 430 can include a touch screen display 435. The input device 430 can also include a cursor control, such as a mouse, a trackball, or cursor direction keys, for communicating direction information and command selections to the processor 410 and for controlling cursor movement on the display 435. The display 435 can be part of the computing device 104, data processing system 102, or other component of FIG. 1, for example.

The processes, systems and methods described herein can be implemented by the computing system 400 in response to the processor 410 executing an arrangement of instructions contained in main memory 415. Such instructions can be read into main memory 415 from another computer-readable medium, such as the storage device 425. Execution of the arrangement of instructions contained in main memory 415 causes the computing system 400 to perform the illustrative processes described herein. One or more processors in a multi-processing arrangement may also be employed to execute the instructions contained in main memory 415. Hard-wired circuitry can be used in place of or in combination with software instructions together with the systems and methods described herein. The systems and methods described herein are not limited to any specific combination of hardware circuitry and software.

Although an example computing system has been described in FIG. 4, the subject matter including the operations described in this specification can be implemented in other types of digital electronic circuitry, or in computer software, firmware, or hardware, including the structures disclosed in this specification and their structural equivalents, or in combinations of one or more of them.

For situations in which the systems discussed herein collect personal information about users or may make use of personal information, the users may be provided with an opportunity to control whether programs or features may collect personal information (e.g., information about a user's social network, social actions or activities, a user's preferences, or a user's location) or to control whether or how to receive content from a content server or other data processing system that may be more relevant to the user. In addition, certain data may be anonymized in one or more ways before it is stored or used, so that personally identifiable information is removed when generating parameters. For example, a user's identity may be anonymized so that no personally identifiable information can be determined for the user, or a user's geographic location may be generalized where location information is obtained (such as to a city, postal code, or state level), so that a particular location of a user cannot be determined. Thus, the user may have control over how information is collected about him or her and used by the content server.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). The operations described in this specification can be implemented as operations performed by a data processing apparatus on data stored on one or more computer-readable storage devices or received from other sources.

The terms "data processing system," "computing device," "component," and "data processing apparatus" encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing, and grid computing infrastructures. For example, audio signal generator component 136, content selector component 138, NLP component 112, and other data processing system 102 components can include or share one or more data processing apparatuses, systems, computing devices, or processors. For example, interface 110, NLP component 112, mode detector component 114, fetching component 116, and other computing device 104 components can include or share one or more data processing apparatuses, systems, computing devices, or processors.

A computer program (also known as a program, software, software application, app, script, or code) can be written in any form of programming language, including compiled or interpreted languages and declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs (e.g., components of the data processing system 102) to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by or incorporated in special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as system 100 or system 400 can include clients and servers. A client and server are generally remote from each other and typically interact through a communication network (e.g., the network 105). The relationship of client and server arises by virtue of computer programs running on the respective computers and having a client-server relationship to each other. In some implementations, a server transmits data (e.g., data packets representing a content item) to a client device (e.g., for purposes of displaying data to and receiving user input from a user interacting with the client device). Data generated at the client device (e.g., a result of the user interaction) can be received from the client device at the server (e.g., received by the data processing system 102 from the computing device 104 or the data provider device 108).

While operations are depicted in the drawings in a particular order, such operations are not required to be performed in the particular order shown or in sequential order, and all illustrated operations are not required to be performed. Actions described herein can be performed in a different order.

The separation of various system components does not require separation in all implementations, and the described program components can be included in a single hardware or software product. For example, the NLP component 112 or the content selector component 138, can be a single component, app, or program, or a logic device having one or more processing circuits, or part of one or more servers of the data processing system 102.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements, and features discussed in connection with one implementation are not intended to be excluded from a similar role in other implementations or implementations.

The phraseology and terminology used herein is for the purpose of description and should not be regarded as limiting. The use of "including," "comprising," "having," "containing," "involving," "characterized by," "characterized in that," and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation," or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. Further, a reference to "at least one of 'A' and 'B'" can include only "A," only "B," as well as both "A" and "B." Such references used in conjunction with "comprising" or other open terminology can include additional items.

Where technical features in the drawings, detailed description, or any claim are followed by reference signs, the reference signs have been included to increase the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

The invention claimed is:

1. A system to transfer data from memory to manage graphical output latency, comprising:

a computing device having one or more processors communicatively coupled to a display device and a microphone; and a natural language processing component executed by the computing device, the computing device to:

receive an acoustic signal that carries a query provided by a user, the acoustic signal detected by the microphone;

determine that a wireless controller device operational to control the computing device is in an inactive state;

identify, based on receiving of the acoustic signal and determining that the wireless controller device is in the inactive state, a first template user interface for establishing a first interaction mode for a graphical user interface of the display device;

identify the query based on processing the received acoustic signal using the natural language processing component;

prefetch, based on the identified query and based on identifying the first template user interface, a first amount of electronic content items that are responsive to the identified query; and subsequent to prefetching the first amount of electronic content items and prior to receiving an indication from the user to display any additional electronic content items that are responsive to the identified query;

identify, based on detection of the wireless controller device entering an active state, a second template user interface for establishing a second interaction mode for the graphical user interface; and prefetch, based on the identified query and based on identifying the second template user interface, a second set of the additional electronic content items that are responsive to the identified query, wherein the second set contains a different amount of electronic content items than the first amount of electronic content items.

2. The system of claim 1, wherein the first amount of electronic content items comprises a portion of the electronic content items capable of being rendered based on the first template user interface.

3. The system of claim 1, wherein the amount of electronic content items included in the second set comprises a portion of electronic content items capable of being rendered based on the second template user interface.

4. The system of claim 1, wherein the first interaction mode comprises a voice interaction mode.

5. The system of claim 4, wherein the second interaction mode comprises a combined voice and wireless control device interaction mode.

6. The system of claim 5, wherein the amount of electronic content items included in the second set is greater than the first amount of electronic content items.

7. The system of claim 1, further comprising the computing device to:

prefetch the electronic content items for storage in a local memory of the computing device; and retrieve, from the local memory responsive to one of a second acoustic signal or input from the wireless controller device, one or more of the electronic content items for display via the graphical user interface.

8. The system of claim 1, wherein determining that the wireless controller device operational to control the computing device is in the inactive state includes identifying an absence of a particular signal from the wireless controller device during a predetermined time interval prior to receipt of the acoustic signal.

9. The system of claim 1, wherein the first amount of electronic content items corresponds to a first value set for a prefetch parameter, and wherein the amount of electronic content items in the second set corresponds to a second value set for the prefetch parameter by overriding the first value of the prefetch parameter.

10. A method, comprising:

by one or more processors of a computing device:

receiving an acoustic signal that carries a query provided by a user, the acoustic signal detected by a microphone of the computing device;

determining that a wireless controller device operational to control the computing device is in an inactive state;

identifying, based on receiving of the acoustic signal and determining that the wireless controller device is in the inactive state, a first template user interface for establishing a first interaction mode for a graphical user interface of the computing device;

identifying the query based on processing the received acoustic signal using a natural language processing component executed by the computing device;

prefetching, based on the identified query and based on identifying the first template user interface, a first amount of electronic content items that are responsive to the identified query; and subsequent to prefetching the first amount of electronic content items and prior to receiving an indication from the user to display any additional electronic content items that are responsive to the identified query:

identifying, based on detection of the wireless controller device entering an active state, a second template user interface for establishing a second interaction mode for a graphical user interface; and prefetching, based on the identified query and based on identifying the second template user interface, a second set of the additional electronic content items that are responsive to the identified query, wherein the second set contains a different amount of electronic content items than the first amount of electronic content items.

11. The method of claim 10, wherein the first amount of electronic content items comprises a portion of the electronic content items capable of being rendered based on the first template user interface.

12. The method of claim 10, wherein the amount of electronic content items included in the second set comprises a portion of electronic content items capable of being rendered based on the second template user interface.

13. The method of claim 10, wherein the first interaction mode comprises a voice interaction mode.

14. The method of claim 13, wherein the second interaction mode comprises a combined voice and wireless control device interaction mode.

15. The method of claim 14, wherein the amount of electronic content items included in the second set is greater than the first amount of electronic content items.

16. The method of claim 10, further comprising the computing device to:

prefetch the electronic content items for storage in a local memory of the computing device; and retrieve, from the local memory responsive to one of a second acoustic signal or input from the wireless controller device, one or more of the electronic content items for display via the graphical user interface.

17. The method of claim 10, wherein determining that the wireless controller device operational to control the computing device is in the inactive state includes identifying an absence of a particular signal from the wireless controller device during a predetermined time interval prior to receipt of the acoustic signal.

18. The method of claim 10, wherein the first amount of electronic content items corresponds to a first value set for a prefetch parameter, and wherein the amount of electronic content items in the second set corresponds to a second value set for the prefetch parameter by overriding the first value of the prefetch parameter.

19. At least one non-transitory computer-readable storage medium comprising instructions which, when executed by one or more processors, cause a computing device to:

receive an acoustic signal that carries a query provided by a user, the acoustic signal detected by a microphone of the computing device;

determine that a wireless controller device operational to control the computing device is in an inactive state;

identify, based on receiving of the acoustic signal and determining that the wireless controller device is in the inactive state, a first template user interface for establishing a first interaction mode for a graphical user interface of the computing device;

identify the query based on processing the received acoustic signal using the natural language processing component;
prefetch, based on the identified query and based on identifying the first template user interface, a first amount of electronic content items that are responsive to the identified query; and
subsequent to prefetching the first amount of electronic content items and prior to receiving an indication from the user to display any additional electronic content items that are responsive to the identified query:
  identify, based on detection of the wireless controller device entering an active state, a second template user interface for establishing a second interaction mode for the graphical user interface; and
  prefetch, based on the identified query and based on identifying the second template user interface, a second set of the additional electronic content items that are responsive to the identified query, wherein the second set contains a different amount of electronic content items than the first amount of electronic content items.

\* \* \* \* \*